(12) United States Patent
Sakiyama et al.

(10) Patent No.: US 8,471,914 B2
(45) Date of Patent: Jun. 25, 2013

(54) IMAGE PROCESSING SYSTEM WITH EASE OF OPERATION

(75) Inventors: Daisuke Sakiyama, Kawanishi (JP);
Takeshi Morikawa, Takarazuka (JP);
Takeshi Minami, Amagasaki (JP);
Kaitaku Ozawa, Itami (JP); Kazuya Anezaki, Amagasaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 62 days.

(21) Appl. No.: 13/296,966

(22) Filed: Nov. 15, 2011

(65) Prior Publication Data

US 2012/0120259 A1    May 17, 2012

(30) Foreign Application Priority Data

Nov. 15, 2010 (JP) ................................. 2010-254514

(51) Int. Cl.
    *H04N 5/225*    (2006.01)
(52) U.S. Cl.
    USPC .................................... 348/207.2; 348/207.1
(58) Field of Classification Search
    USPC ................... 348/207.1, 207.2, 211.99, 211.2, 348/211.3, 211.8; 455/556.1, 556.2
    See application file for complete search history.

(56) References Cited

U.S. PATENT DOCUMENTS

| | | | |
|---|---|---|---|
| 7,516,421 B2 | 4/2009 | Asano et al. | |
| 8,095,174 B2 * | 1/2012 | Tomita | 455/550.1 |
| 2008/0171573 A1 * | 7/2008 | Eom et al. | 455/556.2 |
| 2010/0182435 A1 * | 7/2010 | Machida et al. | 348/207.1 |
| 2011/0244919 A1 * | 10/2011 | Aller et al. | 455/556.1 |

FOREIGN PATENT DOCUMENTS

| | | |
|---|---|---|
| JP | 9-70021 | 3/1997 |
| JP | 2003-22229 | 1/2003 |
| JP | 2005-26740 | 1/2005 |
| JP | 2006-91390 | 4/2006 |
| JP | 2006-351024 | 12/2006 |
| JP | 2007-111921 | 5/2007 |
| JP | 2009-98903 | 5/2009 |
| JP | 2010-88032 | 4/2010 |

OTHER PUBLICATIONS

Notice of Grounds of Rejection mailed Aug. 28, 2012, directed to Japanese Application No. 2010-254514; 6 pages.

* cited by examiner

*Primary Examiner* — Aung S Moe
*Assistant Examiner* — Amy Hsu
(74) *Attorney, Agent, or Firm* — Morrison & Foerster LLP

(57) ABSTRACT

When a shot is taken by a portable terminal, the position and orientation at the time of shooting is transmitted to an information processing apparatus. The information processing apparatus, which stores information including the position of equipment, detects the equipment included in the shot image by the portable terminal, based on the position and orientation of the portable terminal and the position of the equipment, and transmits information about the equipment to the portable terminal. The portable terminal obtains an operation history on an image processing apparatus in the equipment based on the received information, and displays an operation screen presenting the operation history in a selectable manner on a display unit. Then, when a selection of operation history is accepted, a control signal for allowing the image processing apparatus to execute image processing indicated by the operation history is transmitted to the image processing apparatus.

15 Claims, 11 Drawing Sheets

FIG.11

| FUNCTION | DOCUMENT NAME | TARGET PC |
|---|---|---|
| Print | DOCUMENT 1 | PC_1 |
| Print | DOCUMENT 2 | PC_1 |
| Scan | DOCUMENT 1 | PC_1 |
| Scan | DOCUMENT 2 | PC_2 |
| Scan | DOCUMENT 3 | PC_2 |

FIG.12

| Scan ▽ | DOCUMENT 1 ▽ | PC_1 ▽ |
|---|---|---|
| Print | DOCUMENT 2 | PC_2 |
| ⋮ | DOCUMENT 3 | |
|  | ⋮ | | a portable terminal, a control method, and a portable terminal.

IMAGE PROCESSING SYSTEM WITH EASE OF OPERATION

This application is based on Japanese Patent Application No. 2010-254514 filed with the Japan Patent Office on Nov. 15, 2010, the entire content of which is hereby incorporated by reference.

BACKGROUND OF THE INVENTION

1. Field of the Invention

The present invention relates to an image processing system, a control method, and the portable terminal, and more particularly to an image processing system in which an image processing apparatus is operated by a portable terminal, a control method, and the portable terminal.

2. Description of the Related Art

Image processing apparatuses such as copiers, printers, and MFPs (Multi-Functional Peripherals) including those functions are often used in office environments. Many users have opportunities to use those apparatuses.

On one hand, with the recent widespread use of portable terminals, users carry portable equipment such as mobile phones having a function of connecting to the Internet, a camera function, and a position detection function and are familiar themselves with using them. Then, as disclosed in, for example, Japanese Laid-Open Patent Publication Nos. 2006-351024 and 2006-091390, some portable information terminals obtain information stored beforehand in association with positional information from a server and combine the information with the captured image, thereby allowing users to view information such as facility usage status or reservation information based on the captured image.

On the other hand, Japanese Laid-Open Patent Publication No. 2003-022229, previously filed by the applicant of the present application, discloses an information processing system to facilitate operations of an image processing apparatus, in which information indicating an operation location of a user and an operation content are stored as history in association with information of an operation target, whereby the information stored in association with the operation location and the operation content is extracted and presented when an operation input at a certain location is accepted.

As such image processing apparatuses have grown more sophisticated, the operations for users to give operation instructions become complicated. Therefore, the users who use the apparatuses less frequently or the users who use different kinds of apparatuses find it difficult to recognize available functions or find it difficult to use the apparatuses due to the complicated operations.

Then, in light of the widespread use of portable terminals as described above, users may desire to use portable terminals familiar to them even when operating image processing apparatuses.

SUMMARY OF THE INVENTION

The present invention is made in view of the foregoing problem. An object of the present invention is to provide an image processing system in which an image processing apparatus can be operated easily using a portable terminal, a control method, and a portable terminal.

In order to achieve the object, in accordance with an aspect of the present invention, an image processing system includes a portable terminal, equipment, and an information processing apparatus. At least one of the equipment is an image processing apparatus including a controller. The portable terminal includes a shooting unit, an obtaining unit for obtaining positional information and orientation information of the portable terminal, a display unit, and an input unit for inputting an instruction on an operation screen displayed on the display unit. The information processing apparatus includes a storage unit for storing, as information about the equipment, positional information of the equipment and communication information for communicating with the equipment. The portable terminal transmits positional information and orientation information at a time of shooting by the shooting unit to the information processing apparatus. The information processing apparatus detects one of the equipment that is included in an image shot by the shooting unit of the portable terminal, based on the positional information and orientation information at a time of shooting at the portable terminal, and transmits information about the detected equipment to the portable terminal. The portable terminal further includes a controller for executing a process of obtaining an operation history on the image processing apparatus, based on the received information about the equipment, allowing the display unit to display an operation screen presenting the operation history in a selectable manner, and when accepting a selection of the operation history at the input unit, transmitting a control signal for allowing the image processing apparatus to execute image processing specified by the selected operation history, to the image processing apparatus.

Preferably, the information processing apparatus further stores an operation history as the information about the equipment, and the controller of the portable terminal allows the display unit to display the operation screen using the operation history included in the received information about the equipment.

Preferably, the controller of the portable terminal requests an operation history from the equipment, based on the communication information for communicating with the equipment that is included in the received information about the equipment, and obtains the operation history received from the equipment.

Preferably, the portable terminal further includes a storage unit for storing positional information and orientation information at a time when the equipment is shot, in association with information specifying the equipment. When accepting a selection of the equipment, the portable terminal transmits positional information and orientation information at a time when the selected equipment is shot, to the information processing apparatus.

Preferably, the equipment includes a controller for controlling the image processing apparatus.

Preferably, the operation history includes information specifying an image processing apparatus that has executed image processing designated by the operation, a function of the image processing apparatus that is necessary for the image processing, and image data subjected to the image processing.

More preferably, when allowing the display unit to display the operation screen, the controller of the portable terminal sorts the operation history so as to be displayed for each image processing apparatus that has executed image processing designated by the operation history.

Preferably, when allowing the display unit to display the operation screen, the controller of the portable terminal sorts the operation history so as to be displayed for each function of the image processing apparatus that is necessary for image processing designated by the operation history.

Preferably, the operation history includes information specifying an image processing apparatus that has executed image processing designated by the operation, a function of the image processing apparatus that is necessary for the image processing, image data subjected to the image processing, and a storage location of image data obtained by the image processing. When allowing the display unit to display the operation screen, the controller of the portable terminal sorts the operation history so as to be displayed for each storage location of image data obtained by image processing designated by the operation history.

Preferably, the controller of the portable terminal allows the display unit to display the operation history in a selectable and changeable manner on the operation screen, and when accepting an instruction to change the operation history on the operation screen, transmits a control signal for allowing the image processing apparatus to execute image processing specified by the changed operation history, to the image processing apparatus.

In accordance with another aspect of the present invention, a control method for an image processing system is provided. The image processing system includes a portable terminal having a shooting unit and a display unit, equipment, at least one of which is an image processing apparatus, and an information processing apparatus. The information processing apparatus stores, as information about the equipment, positional information of the equipment and communication information for communicating with the equipment. The control method includes the steps of: causing the portable terminal to transmit positional information and orientation information at a time of shooting by the shooting unit of the portable terminal to the information processing apparatus; causing the information processing apparatus to detect one of the equipment that is included in an image shot by the shooting unit of the portable terminal, based on the positional information and orientation information received from the portable terminal and the positional information included in the information about the equipment, and to transmit the information about the detected equipment to the portable terminal; causing the portable terminal to obtain an operation history on the image processing apparatus in the equipment, based on the information about the equipment transmitted from the information processing apparatus, and to allow the display unit to display an operation screen presenting the operation history in a selectable manner; when accepting a selection of the operation history, causing the portable terminal to transmit a control signal for allowing the image processing apparatus to execute image processing specified by the selected operation history, to the image processing apparatus; and executing corresponding image processing based on the signal in the image processing apparatus.

In accordance with a further aspect of the present invention, a portable terminal includes a shooting unit, an obtaining unit for obtaining positional information and orientation information of the portable terminal, a display unit, an input unit for inputting an instruction on an operation screen displayed on the display unit, and a controller. The controller executes a process of transmitting positional information and orientation information at a time of shooting by the shooting unit to an information processing apparatus, a process of obtaining an operation history on an image processing apparatus in equipment based on information about equipment that is received from the information processing apparatus, and allowing the display unit to display an operation screen presenting the operation history in a selectable manner, and a process of accepting a selection of the operation history at the input unit and then transmitting a control signal for allowing the image processing apparatus to execute image processing specified by the selected operation history, to the image processing apparatus.

Preferably, the controller further executes a process of requesting the operation history from the equipment based on communication information for communicating with the equipment that is included in the received information about the equipment, in the process of allowing the display unit to display an operation screen, and a process of receiving the operation history from the equipment.

In accordance with a still further aspect of the present invention, a non-transitory computer-readable recording medium is encoded with a control program for causing a portable terminal to execute processing. The portable terminal includes a shooting unit and a display unit. The control program causes the portable terminal to execute the steps of: transmitting positional information and orientation information at a time of shooting by the shooting unit to an information processing apparatus; obtaining an operation history on an image processing apparatus in equipment based on information about equipment that is received from the information processing apparatus, and displaying an operation screen presenting the operation history in a selectable manner on the display unit; and accepting a selection of the operation history and then transmitting a control signal for allowing the image processing apparatus to execute image processing specified by the selected operation history, to the image processing apparatus.

Preferably, the step of the control program of displaying an operation screen on the display unit includes the steps of: requesting the operation history from the equipment based on communication information for communicating with the equipment that is included in the received information about the equipment; and receiving the operation history from the equipment.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a diagram showing a specific example of an operation screen appearing on an operation panel of the portable terminal through the process in step S113 in FIG. 10.

FIG. 12 is a diagram showing another specific example of the operation screen.

DESCRIPTION OF THE PREFERRED EMBODIMENTS

Figure 1:
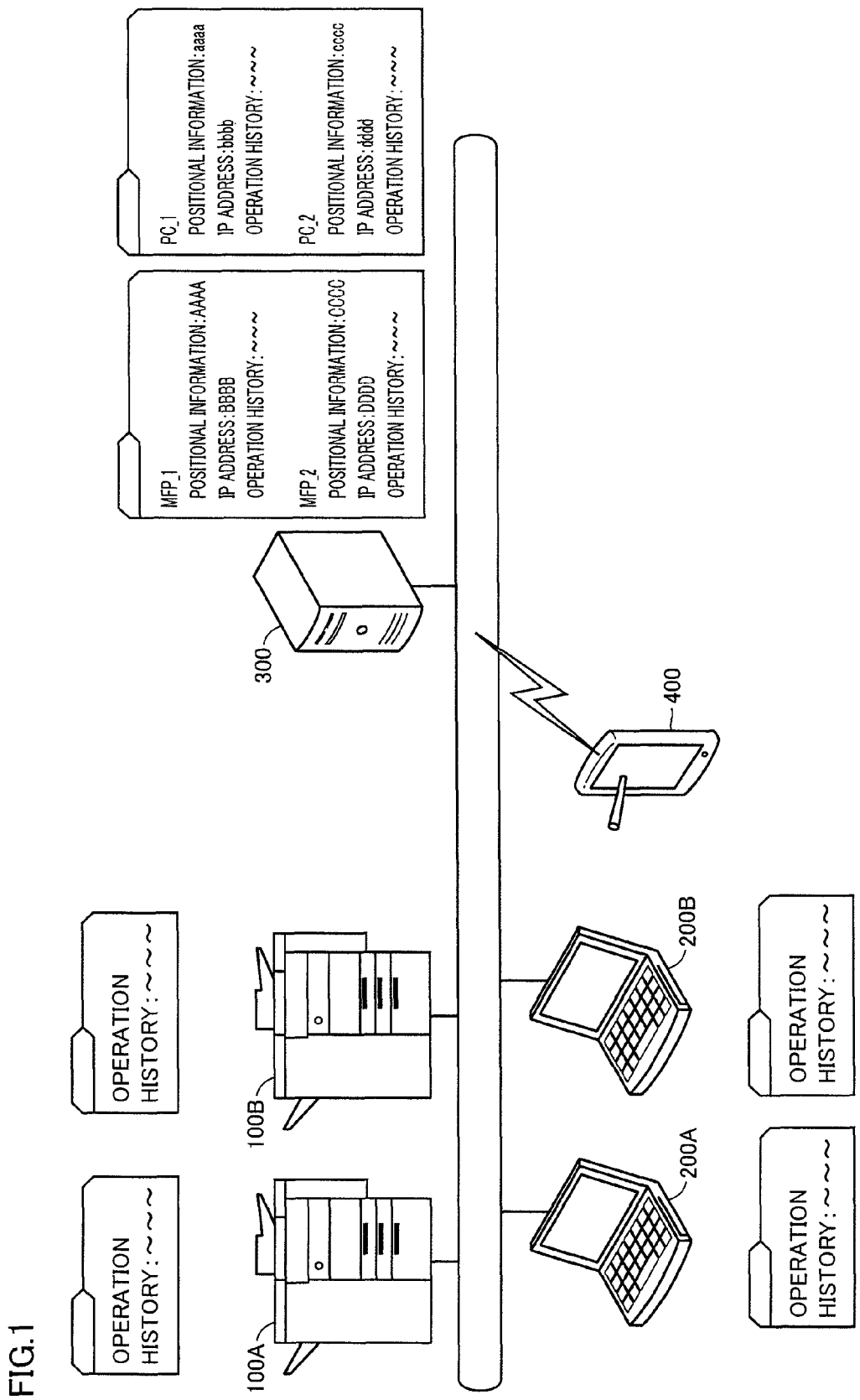
FIG. 1 is a diagram showing a specific example of a configuration of an image processing system according to an embodiment.

In the following, an embodiment of the present invention will be described with reference to the figures. In the following description, the same parts and components are denoted with the same reference numerals. Their names and functions are also the same.

<System Configuration>

FIG. 1 is a diagram showing a specific example of a configuration of an image processing system according to an embodiment.

Referring to FIG. 1, the image processing system according to the present embodiment includes an MFP (Multi-Functional Peripheral) 100 serving as an image processing apparatus, a personal computer (hereinafter referred to as PC) 200 serving as a control device for controlling MFP 100, a server 300, and a portable terminal 400.

The image processing apparatus is not limited to an MFP and may be a printer, a facsimile machine, a copier, or any other similar device having at least one or more image processing functions. MFP 100 is an image processing apparatus that combines these functions.

As shown in FIG. 1, the image processing system may include a plurality of MFPs 100A, 100B, which are collectively referred to as MFP 100.

The information processing apparatus is not limited to a PC and may be any other device as long as it stores a program for controlling MFP 100, such as a printer driver, and includes a CPU (Central Processing Unit) 20 (FIG. 3) which executes the program to output an operation signal to MFP 100. Any other device may be, for example, a mobile phone or a portable document reader, and may be combined with portable terminal 400 described later.

As shown in FIG. 1, the image processing system may include a plurality of PCs 200A, 200B, which are collectively referred to as PC 200.

Portable terminal 400 is, for example, a mobile phone or any other device at least having a camera function, an instruction input function, and a communication function.

Server 300 is a general personal computer or any other similar device.

MFP 100, PC 200, and server 300 are connected to a wired or wireless network such as a LAN. Portable terminal 400 can also connect to the network, so that portable terminal 400 can communicate with each of MFP 100, PC 200, and server 300 via the network.

MFP 100, server 300, and PC 200 each have a function for performing wireless communication. Portable terminal 400 can wirelessly communicate with each of MFP 100, PC 200, and server 300. For example, communication using Bluetooth® or infrared communication can be used for wireless communication.

<Operation Overview>

In the image processing system according to the present embodiment, server 300 stores information of each of MFP 100 and PC 200 included in the image processing system, as "equipment information."

The equipment information includes an operation history in each device. Specifically, in the case where the equipment is MFP 100, the operation history in each MFP 100 is included. In the case where the equipment is PC 200, the operation history about MFP 100 in each PC 200 is included.

The equipment information further includes positional information which is information representing the location of each device, and an IP address which is information for communication via LAN.

The operation history is transmitted to server 300 by MFP 100 and PC 200 and then registered in server 300. The operation history may be registered, by way of example, in such a manner that every time each device accepts an operation input and generates a control signal in accordance with the operation input, history information representing the control signal is generated and transmitted to server 300. In another example, each device may accumulate the history information in a predetermined memory and transmit the history information to server 300 at a preset timing, for example, at a timing as requested by server 300, at predetermined time intervals, at a timing when a predetermined amount of data is accumulated, or at a timing when the device connects to the LAN. The history information in each device may be deleted from the storage area upon being transmitted to server 300 or may be transmitted to server 300 while being left in the storage area.

The operation history at least includes information specifying MFP 100 that has executed the image processing, information (function name) specifying the function of MFP 100 that is used in the image processing, and data (document name) subjected to the image processing. The operation history may additionally include information specifying a device (target PC), which is a storage location of image data obtained as a result of the image processing, and may include information specifying the user who has performed the operation, as described later. For example, when the image processing is a process of storing image data obtained by scanning a document into a designated storage area, the storage location of image data obtained as a result of the image processing refers to the storage area or a device having the storage area. For example, when the image processing is a process of transmitting image data obtained by scanning a document to a designated device, the storage location refers to the device to which the image data is transmitted. The device serving as a storage location of image data may be a PC or MFP 100 itself.

The positional information is, for example, a combination of latitude, longitude and altitude, or the closest access point of the LAN. The positional information may be registered in server 300, for example, by an administrator when each device is installed, or may be registered in each device and transmitted to server 300 at a predetermined timing to be registered in server 300. Alternatively, when each device has a function of obtaining its own positional information, each device may obtain its own positional information at a predetermined timing using that function and may transmit the positional information to server 300 for registration in server 300.

The information for communication (hereinafter also referred to as communication information) may be, for example, an IP address. Alternatively, when Bluetooth® is used in communication as described above, the communication information may be a Bluetooth® address. When each device performs different kinds of communication, the communication information may be an address corresponding to each kind of communication. In the following description, it is assumed that each device included in the image processing system performs communication via the LAN and stores an IP address as the communication information.

The communication information may be registered in server 300, for example, by an administrator when each device is installed, or may be registered in each device and transmitted to server 300 at a predetermined timing to be registered in server 300. Alternatively, in a case where the communication information is automatically assigned to each device at a predetermined timing, for example, when connecting to the LAN, the communication information may be transmitted to server 300 by each device and registered in server 300 at the timing of being assigned or at a predetermined later timing.

The user who carries portable terminal 400 points portable terminal 400 at MFP 100 or PC 200 to shoot a photo, so that the equipment information of the shot device is transmitted from server 300 to portable terminal 400. An operation panel 45 (FIG. 4) of portable terminal 400 displays an operation screen which allows a selection of operation history included in the equipment information.

On the operation screen, the user selects the operation history that represents the operation that the user wants to have MFP 100 to execute. Accordingly, a control signal for executing the same image processing as the image processing represented by the operation history is transmitted from portable terminal 400 to MFP 100, so that MFP 100 executes the image processing.

In the following, the device configurations for performing these operations will be described.

<Configuration of MFP>

Figure 2:
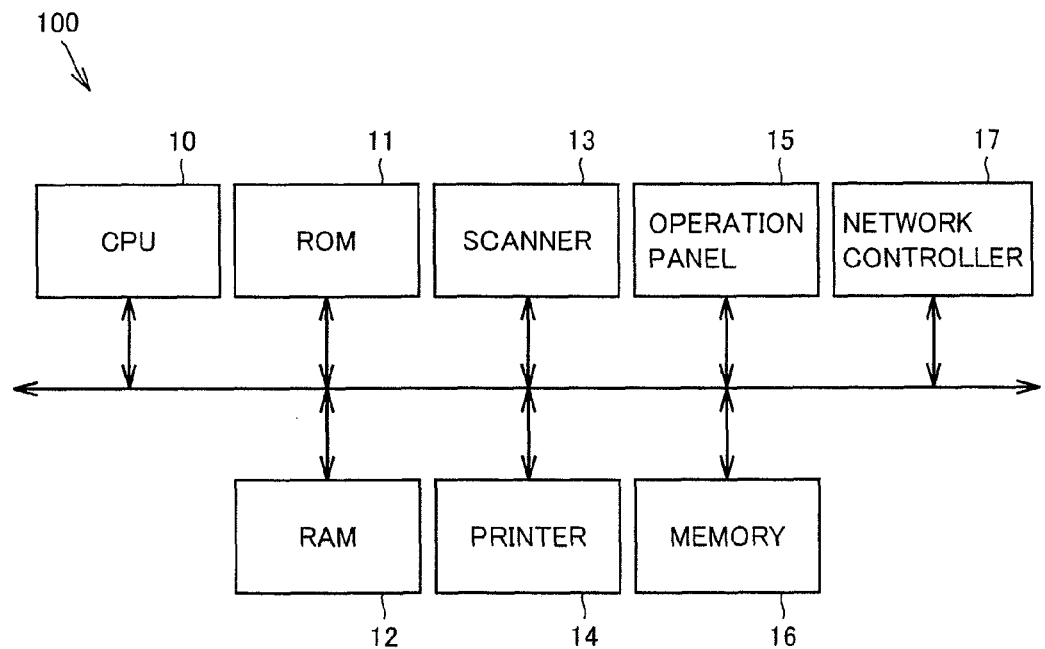
FIG. 2 is a diagram showing a specific example of a hardware configuration of an MFP (Multi-Functional Peripheral) included in the image processing system according to the embodiment.

FIG. 2 shows a specific example of a hardware configuration of MFP 100.

Referring to FIG. 2, MFP 100 includes a CPU (Central Processing Unit) 10 as an arithmetic unit for controlling MFP 100 as a whole, a ROM (Read Only Memory) 11 for storing a program executed in CPU 10, a RAM (Random Access Memory) 12 functioning as a work area for executing a program in CPU 10, a scanner 13 for optically scanning a document placed on a not-shown platen to obtain image data, a printer 14 for fixing image data on print paper, an operation panel 15 including a touch panel for displaying information and accepting an operation input to MFP 100, a memory 16 for storing image data, and a network controller 17 for controlling communication via the LAN.

<Configuration of PC>

Figure 3:
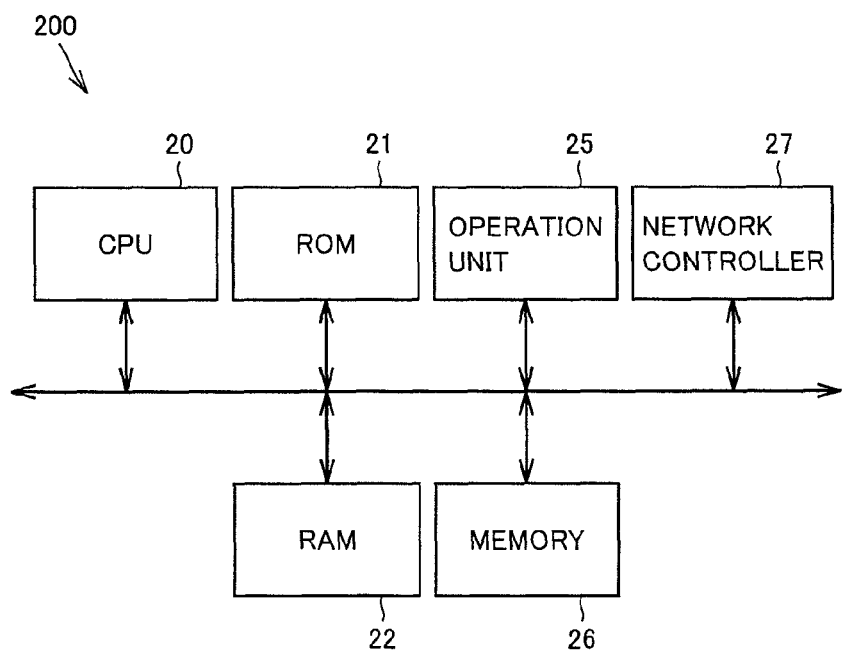
FIG. 3 is a diagram showing a specific example of a hardware configuration of a PC included in the image processing system according to the embodiment.

FIG. 3 shows a specific example of a hardware configuration of PC 200.

Referring to FIG. 3, PC 200 includes a CPU 20 as an arithmetic unit for controlling PC 200 as a whole, a ROM 21 for storing a program executed in CPU 20, a RAM 22 functioning as a work area for executing a program in CPU 20, an operation unit 25 for performing an operation input, a memory 26 for storing a variety of information and operation history, and a network controller 27 for controlling communication via the LAN.

The hardware configuration shown in FIG. 3 is a hardware configuration of a general personal computer, and the hardware configuration of PC 200 is not limited to the one shown in FIG. 3. Specifically, any other configuration may be included, or any other configuration may be included in place of the configuration shown in FIG. 3.

<Configuration of Portable Terminal>

Figure 4:
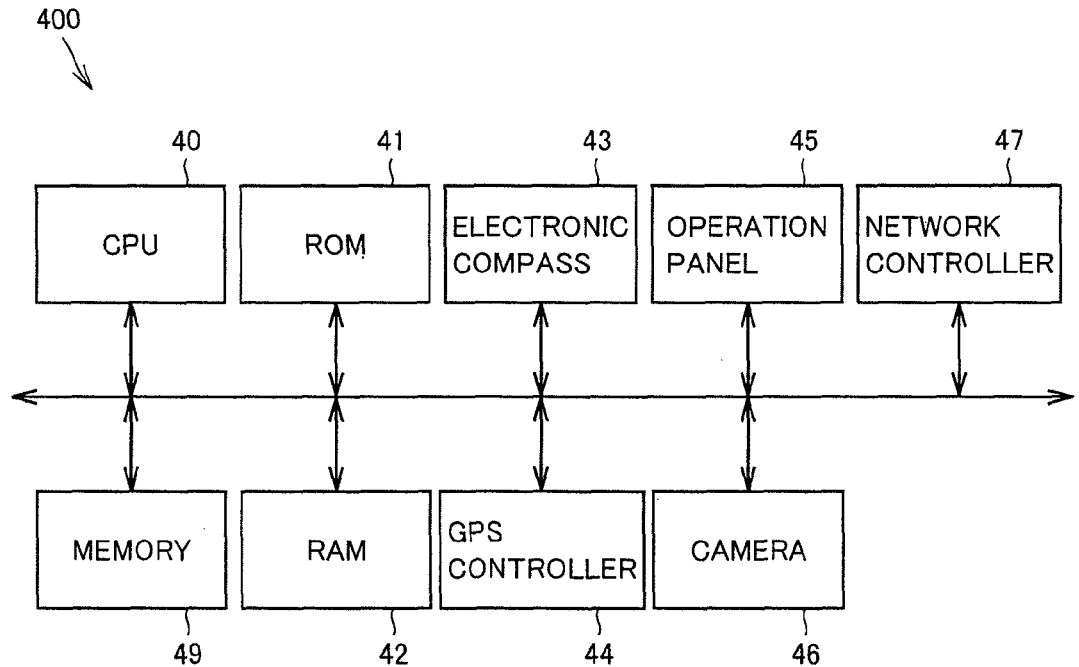
FIG. 4 is a diagram showing a specific example of a hardware configuration of a portable terminal included in the image processing system according to the embodiment.

FIG. 4 shows a specific example of a hardware configuration of portable terminal 400.

Referring to FIG. 4, portable terminal 400 includes a CPU 40 as an arithmetic unit for controlling portable terminal 400 as a whole, a ROM 41 for storing a program executed in CPU 40, a RAM 42 functioning as a work area for executing a program in CPU 40, an electronic compass 43 including a magnetic sensor for detecting an orientation of portable terminal 400, a GPS (Global Positioning System) controller 44 receiving a GPS signal or a positional signal from a base station for obtaining positional information of portable terminal 400, an operation panel 45 including a touch panel for displaying information and accepting an operation input to portable terminal 400, a camera 46, and a network controller 47 for controlling communication via the LAN.

Operation panel 45 may be configured similar to operation panel 15 of MFP 100. More specifically, it includes, for example, a touch panel formed of a display such as a liquid crystal display and a position designating device such as an optical touch panel or a capacitive touch panel, and operation keys.

CPU 40 allows the touch panel to display an operation screen based on the operation history included in the equipment information transmitted from server 300 as described later. CPU 40 specifies the designated position on the touch panel, generates a control signal for allowing MFP 100 to execute image processing based on screen data of the operation screen and the specified position, and transmits the control signal to MFP 100.

Electronic compass 43 and GPS controller 44 output a signal to CPU 40 to indicate the obtained orientation or positional information of portable terminal 400.

It is noted that the hardware configuration shown in FIG. 4 is a hardware configuration necessary for portable terminal 400 to execute the operation illustrated in the operation overview above, and portable terminal 400 is not limited to the one only including this hardware configuration. As any other hardware configuration, for example, a speaker, a microphone, and a communication controller for communicating with a base station may be included in a case where portable terminal 400 has a call function.

<Configuration of Server>

Figure 5:
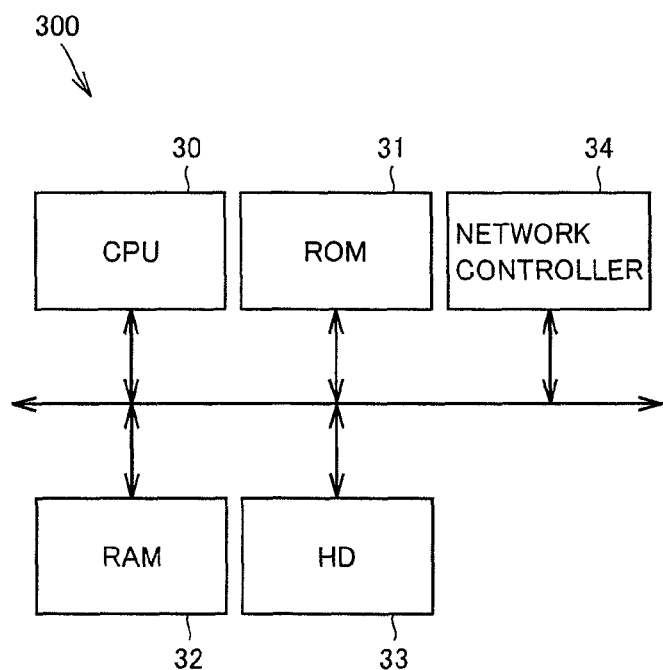
FIG. 5 is a diagram showing a specific example of a hardware configuration of a server included in the image processing system according to the embodiment.

FIG. 5 shows a specific example of a hardware configuration of server 300.

Referring to FIG. 5, server 300 is formed, for example, of a general computer as described above. By way of example, server 300 includes a CPU 30 as an arithmetic unit for controlling server 300 as a whole, a ROM 31 for storing a program executed in CPU 30, a RAM 32 functioning as a work area for executing a program in CPU 30, an HD (Hard Disk) 33 for storing the equipment information and the like, and a network controller 34 for controlling communication via the LAN.

Figure 6A:
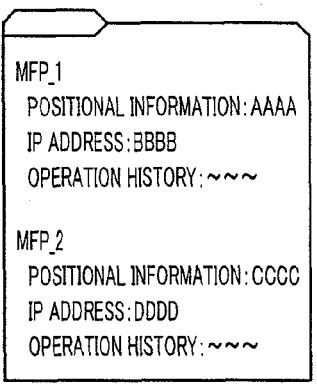
FIG. 6A and FIG. 6B are diagrams showing a specific example of equipment information.
Figure 6B:
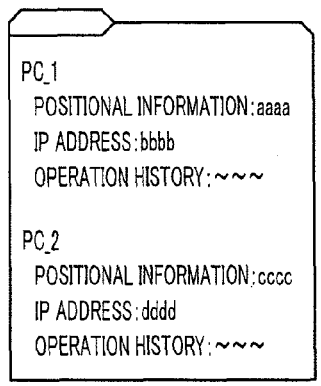

FIG. 6A and FIG. 6B show a specific example of the equipment information stored in HD 33. FIG. 6A illustrates the equipment information of MFP 100, and FIG. 6B illustrates the equipment information of PC 200.

Specifically, referring to FIG. 6A, for each MFP, stored as the equipment information of MFP 100 are information (equipment name) specifying the MFP, positional information, an IP address as communication information, and the operation history.

Referring to FIG. 6B, similarly, for each PC, stored as the equipment information of PC 200 are information (equipment name) for specifying the PC, positional information, an IP address as communication information, and the operation history of MFP 100.

<Functional Configuration>

The functional configuration of each device for implementing the operation as illustrated in the operation overview in the image processing system according to the present embodiment will be described.

Figure 7:
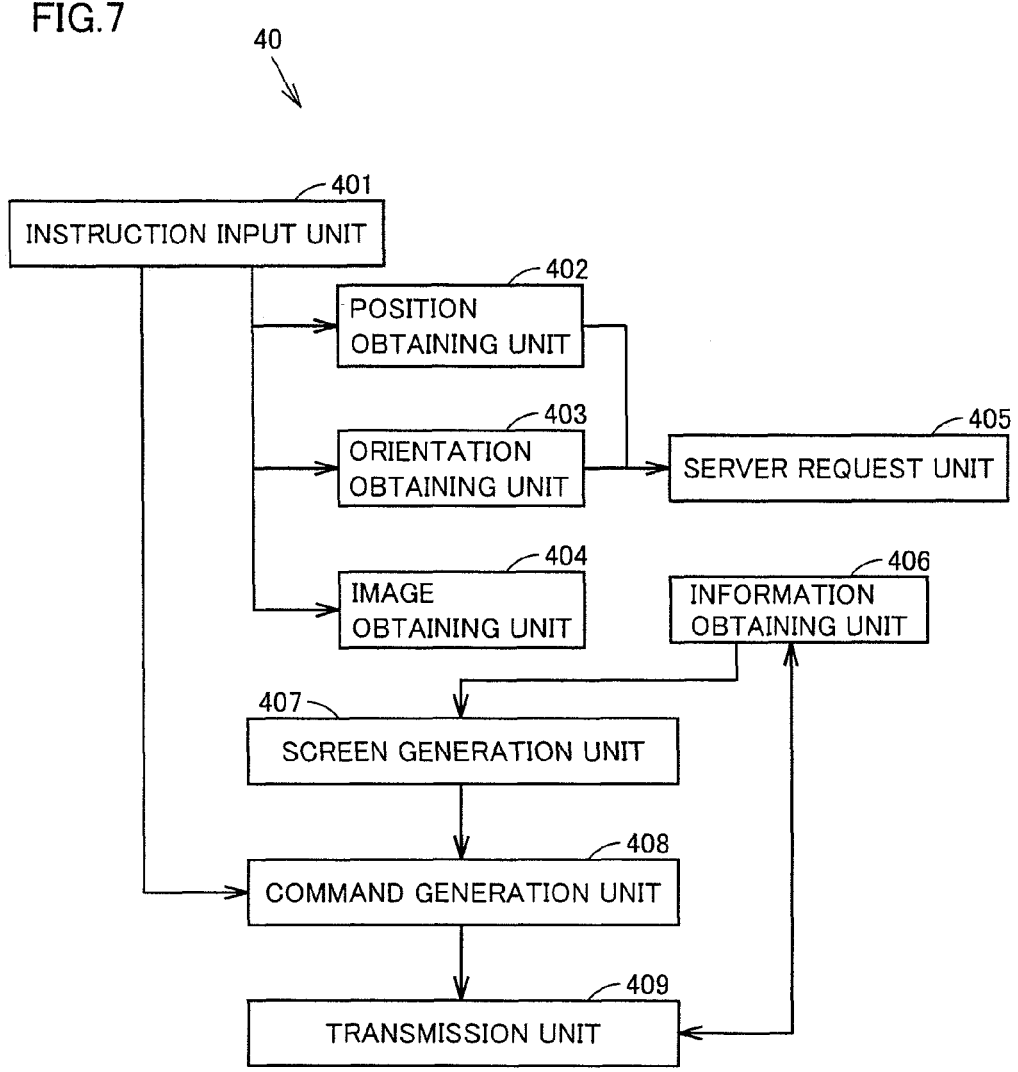
FIG. 7 is a block diagram showing a specific example of a functional configuration of the portable terminal.

FIG. 7 is a block diagram showing a specific example of a functional configuration of portable terminal 400. Each function shown in FIG. 7 is a function mainly formed in CPU 40 when CPU 40 reads out a program stored in ROM 41 and executes the program on RAM 42. However, at least part of the functions may be formed by the hardware configuration shown in FIG. 4.

Referring to FIG. 7, as functions for implementing the operation as described above, portable terminal 400 includes an instruction input unit 401 for accepting an instruction input from operation panel 45, a position obtaining unit 402 for obtaining positional information of portable terminal 400 in response to a shooting instruction from operation panel 45; an orientation obtaining unit 403 for obtaining an orientation of portable terminal 400 in response to a shooting instruction from operation panel 45, an image obtaining unit 404 for obtaining image data captured by shooting by camera 46 in response to a shooting instruction from operation panel 45, a server request unit 405 for requesting the equipment information from server 300 together with the positional information and orientation information obtained in response to a shooting instruction from operation panel 45, an information obtaining unit 406 for obtaining the equipment information from server 300 in response to the request, a screen generation unit 407 for generating screen data for allowing operation panel 45 to display an operation screen based on the obtained equipment information, a command generation unit 408 for generating a control signal, and a transmission unit 409 for transmitting the generated control signal to MFP 100 serving as a control target.

Since position obtaining unit 402 and orientation obtaining unit 403 obtain positional information and orientation information, respectively, in response to a shooting instruction from operation panel 45, the information thereof can serve as information of a shooting position and information of a shooting direction, respectively. Then, in the description below, the positional information and orientation information transmitted from portable terminal 400 to server 300 in accordance with the program are also referred to as shooting position information and shooting direction information, respectively.

Screen generation unit 407 generates screen data for allowing operation panel 45 to display an operation screen which allows a selection of operation history, by referring to the operation history included in the equipment information. CPU 40 performs a display process for allowing operation panel 45 to display an operation screen based on the screen data, whereby the operation screen appears on operation panel 45.

Instruction input unit 401 also accepts an instruction input from operation panel 45, which specifies a position on operation panel 45 displaying the operation screen. A signal specifying the position represented by the instruction input is input to command generation unit 408.

Command generation unit 408 specifies the designated position on the operation screen, based on the signal and the screen data. Command generation unit 408 stores the correspondence between a position on the screen data and a position on operation panel 45 beforehand and specifies the operation history corresponding to the position based on the correspondence. Then, a control signal for allowing MFP 100 to execute image processing represented by the operation history is generated. The generated control signal is input to transmission unit 409.

Transmission unit 409 performs a process for transmitting the generated control signal to the IP address, by referring to the IP address included in the equipment information.

Figure 8:
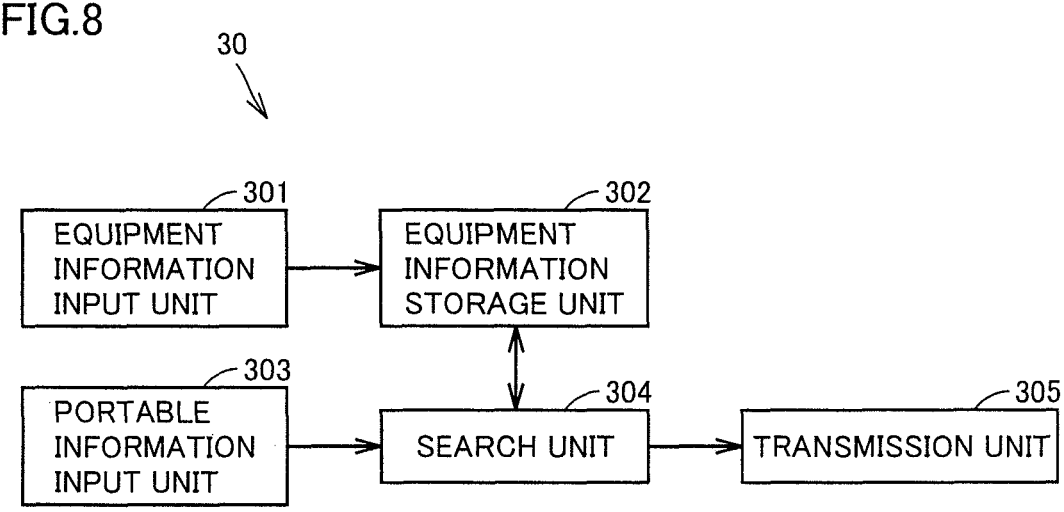
FIG. 8 is a block diagram showing a specific example of a functional configuration of the server.

FIG. 8 is a block diagram showing a specific example of a functional configuration of server 300. Each function shown in FIG. 8 is a function mainly formed in CPU 30 when CPU 30 reads out a program stored in ROM 31 and executes the program on RAM 32. However, at least part of the functions may be formed by the hardware configuration shown in FIG. 5.

Referring to FIG. 8, as functions for implementing the operation as described above, server 300 includes an equipment information input unit 301 for accepting input of positional information, history information, and address information from each equipment, an equipment information storage unit 302 for storing or updating the equipment information input into a predetermined area in HD 33, a portable information input unit 303 for accepting input of a shooting position and a shooting direction together with a request for equipment information from portable terminal 400, a search unit 304 for searching for the equipment present in the shot image by portable terminal 400 based on the shooting position and the shooting direction of portable terminal 400, and a transmission unit 305 for transmitting the equipment information about the found equipment to portable terminal 400.

<Operation Flow 1>

As an operation flow 1, a case where MFP 100 is operated using the operation history included in the equipment information stored in server 300 will be described.

Figure 9:
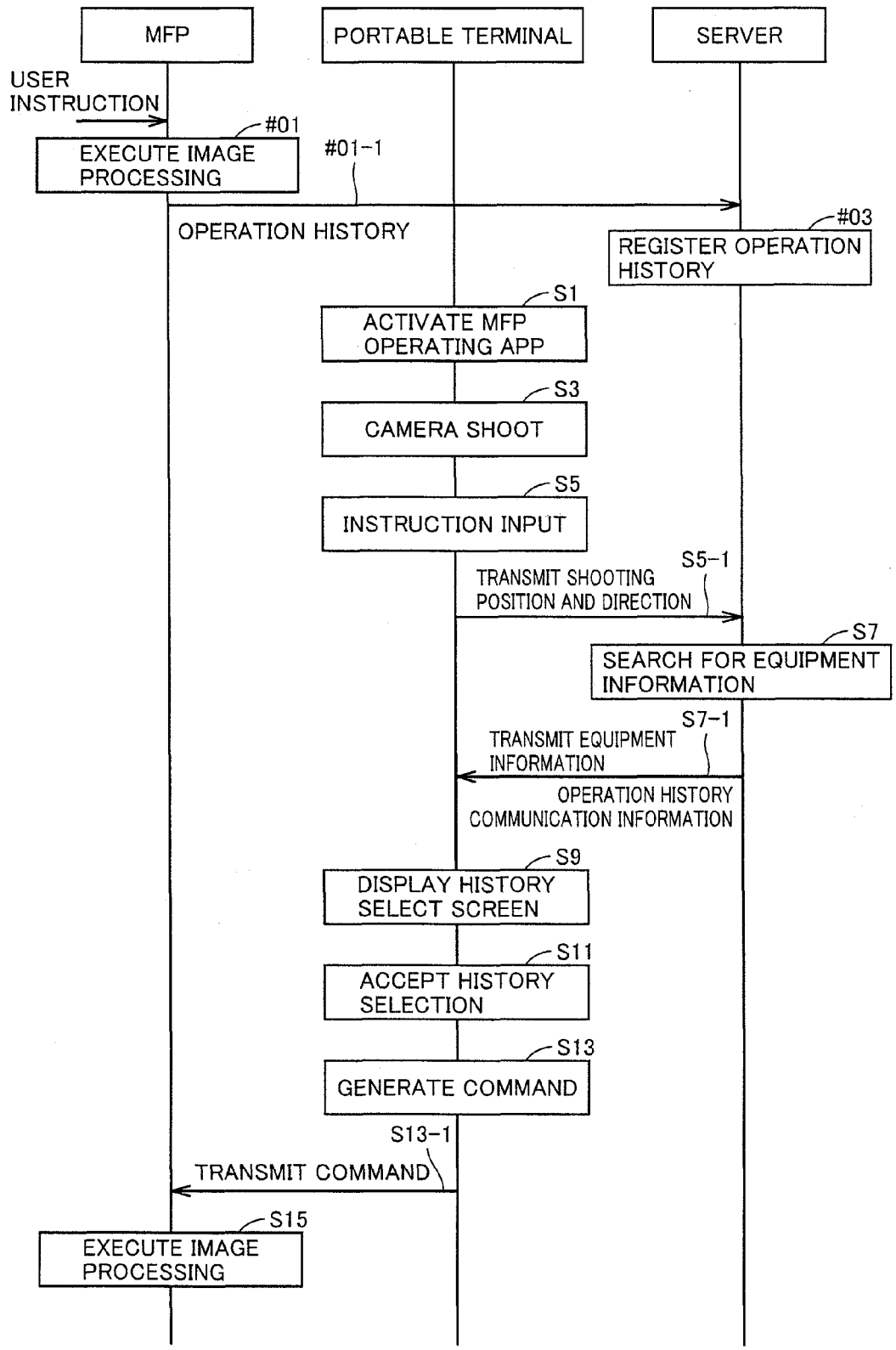
FIG. 9 is a sequence diagram depicting a flow of an operation for operating the MFP in an operation flow 1.

FIG. 9 is a sequence diagram illustrating a flow of an operation for operating the MFP in operation flow 1. FIG. 9 shows a flow of processing in MFP 100 on the left side, a flow of processing in portable terminal 400 at the middle, and a flow of processing in server 300 on the right side. Each operation is implemented when the CPU of each device reads out a program stored in the ROM and executes the program on the RAM.

First, as a precondition of the operation, a process of transmitting an operation history from MFP 100 to server 300 is performed, and the operation history is registered as the equipment information.

Specifically, referring to FIG. 9, upon execution of image processing in MFP 100 in accordance with a user's instruction (#01), the operation history concerning the image processing is transmitted to server 300 at a predetermined timing (#01-1). At server 300 receiving the operation history, a process for registering the received operation history in the equipment information of MFP 100 is executed (#03).

As a result of this precondition operation, the operation history of MFP 100 is stored as the equipment information in server 300.

Next, as an operation for operating the MFP, in a state in which application for operating the MFP is being activated in portable terminal 400 (step S1), the camera shoots a photo (step S3). Thereafter, upon input of an instruction for operating the MFP (step S5), the information that specifies a shooting position and a shooting direction at portable terminal 400 is transmitted to server 300, whereby the corresponding equipment information is requested (step S5-1).

Server 300 accepts the request from portable terminal 400, specifies the equipment located in a prescribed range in the shooting direction from the shooting position of portable terminal 400, by referring to each positional information in the stored equipment information, and searches for the equipment information about the specified equipment (step S7). Then, the corresponding equipment information is transmitted to portable terminal 400 (step S7-1). Here, of the equipment information, at least the operation history and communication information are transmitted.

At portable terminal 400, the application causes an operation screen to appear to present the operation history included in the equipment information in a selectable manner (step S9).

When an operation history is selected (touched) on the operation screen appearing on operation panel 45 of portable terminal 400 (step S11), a control signal is generated for allowing MFP 100 to execute image processing indicated by the selected operation history (step S13). Then, the control signal is transmitted to MFP 100 (step S13-1).

At MFP 100 receiving the control signal, the designated image processing is executed in accordance with the control signal (step S15).

It is noted that in a case where the image processing system requires a user authentication process as a precondition, the operation history may be associated with information (for example, a user ID) specifying the user who performs the operation, as described above. Server 300 may store the correspondence between information specifying portable terminal 400 and a user ID beforehand. In this case, in response to a request from portable terminal 400, in step S7, server 300 may specify the user ID related to portable terminal 400 and search for the equipment information which is about the equipment located within a predetermined range in the shooting direction from the shooting position of portable terminal 400 and which includes the operation history associated with the user ID. Then, the found equipment information may be transmitted in step S7-1.

In this manner, in step S9, an operation screen appears which allows the user related to portable terminal 400 to select an operation history. Therefore, in the case where the same operation as the operation performed before is repeated, an operation screen more easy to operate is displayed.

In the example in FIG. 9, the equipment information of MFP 100 is transmitted as equipment information from server 300. This is an example of the operation in the case where MFP 100 is shot by portable terminal 400. Similarly, when PC 200 is shot by portable terminal 400, the operation history on MFP 100 in PC 200 is received from server 300. In this case, as a precondition, when PC 200 generates and transmits a command for executing image processing to MFP 100 according to a user's instruction, PC 200 transmits the operation history concerning the command to server 300 at a predetermined timing. Accordingly, the operation history on MFP 100 is registered as the equipment information of PC 200 in server 300.

The operation in portable terminal 400 will be described in detail below using the flowchart.

Figure 10:
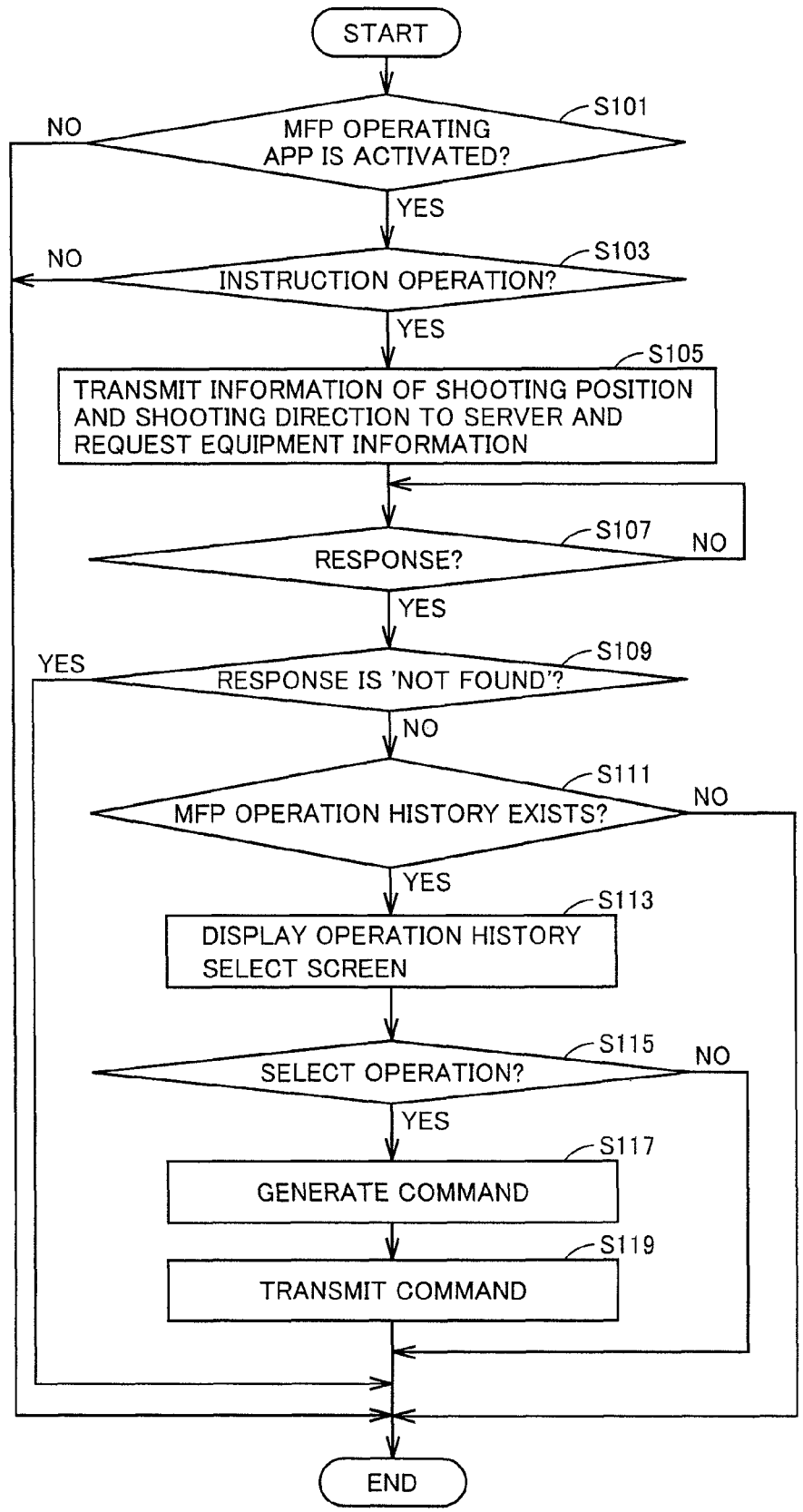
FIG. 10 is a flowchart showing a specific example of an operation in the portable terminal performing an operation for operating the MFP.

FIG. 10 is a flowchart illustrating a specific example of an operation in portable terminal 400 performing an operation for operating the MFP. The operation shown in the flowchart in FIG. 10 is implemented when CPU 40 reads out a program stored in ROM 41 corresponding to the application for operating the MFP and executes the read program on RAM 42.

Referring to FIG. 10, in a state in which CPU 40 is executing the application for operating the MFP (YES in step S101), and if an instruction for operating the MFP is input from operation panel 45 (YES in step S103), then, in step S105, CPU 40 transmits information representing a shooting position and a shooting direction to server 300 and requests transmission of the equipment information of the corresponding equipment.

When a response is received from server 300 (YES in step S107), and when the response is the equipment information (NO in step S109) and the equipment information includes the operation history of MFP (YES in step S111), CPU 40 executes a process for displaying an operation screen presenting the operation history in a selectable manner on operation panel 45, in step S113.

FIG. 11 is a diagram showing a specific example of the operation screen appearing on operation panel 45 through the process in step S113 as described above.

FIG. 11 shows a specific example of the operation screen appearing when the equipment information of MFP 100 is received as equipment information from server 300. In this case, referring to FIG. 11, the operation history displayed as a choice in the operation screen includes, for each image processing performed in MFP 100, information (function name) specifying the function of MFP 100 that is used in the image processing, data (document name) subjected to the image processing, and information specifying a device (target PC) which is a storage location of image data obtained as a result of the image processing. The operation history shown as a choice in the operation screen is not necessarily displayed with all of the above-noted information and may be displayed with at least only one of them. Alternatively, only the information specifying the operation history itself may be displayed. In this case, when the operation history based on such information is selected, the next screen or a pop-up screen may appear to display the detailed contents of the selected operation history.

Preferably, when displaying the operation screen in step S113, CPU 40 sorts the operation history so as to be displayed for each storage location of image data, and generates screen data for the operation screen. Alternatively, preferably, when displaying the operation screen in step S113, CPU 40 sorts the operation history so as to be displayed for each function of the MFP that is necessary for the image processing designated by the operation history, and generates screen data for the operation screen. FIG. 11 illustrates the operation screen based on the screen data generated by sorting the operation history in any of the foregoing manners. In this way, as shown in FIG. 11, the operation history is displayed for each storage location of image data or for each function of the MFP, thereby allowing the user to easily find the desired operation history.

Similarly, when the equipment information of PC 200 is received as equipment information from server 300, preferably, when displaying the operation screen in step S113, CPU 40 sorts the operation history so as to be displayed for each MFP that has executed image processing designated by the operation history, and generates screen data for the operation screen. In this manner, the operation history is displayed for each MFP, thereby allowing the user to easily find the desired operation history.

Upon accepting an operation input on the operation screen (YES in step S115), in step S117, CPU 40 generates a control signal for allowing MFP 100 to execute the image processing indicated by the operation history designated by the operation input.

It is noted that, in step S115, an operation to change the operation history may be accepted in place of an instruction to select. This is applicable to the example described below.

As an example of this case, when generating screen data for displaying the operation screen as shown in FIG. 11 as the operation screen, CPU 40 generates screen data for displaying a function name, a document name, or a storage location of image data in a changeable manner in each operation history. For example, as shown in FIG. 12, a pull-down button is displayed next to each of a function name, a document name, and a target PC. Pressing the button causes another function, another document, or another device to show up as a choice. Other functions of MFP 100, other document names, and other devices may be stored beforehand in portable terminal 400, or may be obtained with reference to the function included in any other operation history, or may be included in the equipment information about MFP 100 that is transmitted from server 300.

In this case, in step S117, CPU 40 generates a control signal for allowing MFP 100 to execute image processing indicated by the changed operation history, based on the changed operation history.

<Operation Flow 2>

As an operation flow 2, a case where the operation history is stored in each device and the equipment information including information other than the operation history is stored in server 300 will be described. In other words, in this case, server 300 stores the positional information and communication information as the equipment information of each of MFP 100 and PC 200, and does not have to store the operation history.

Figure 13:
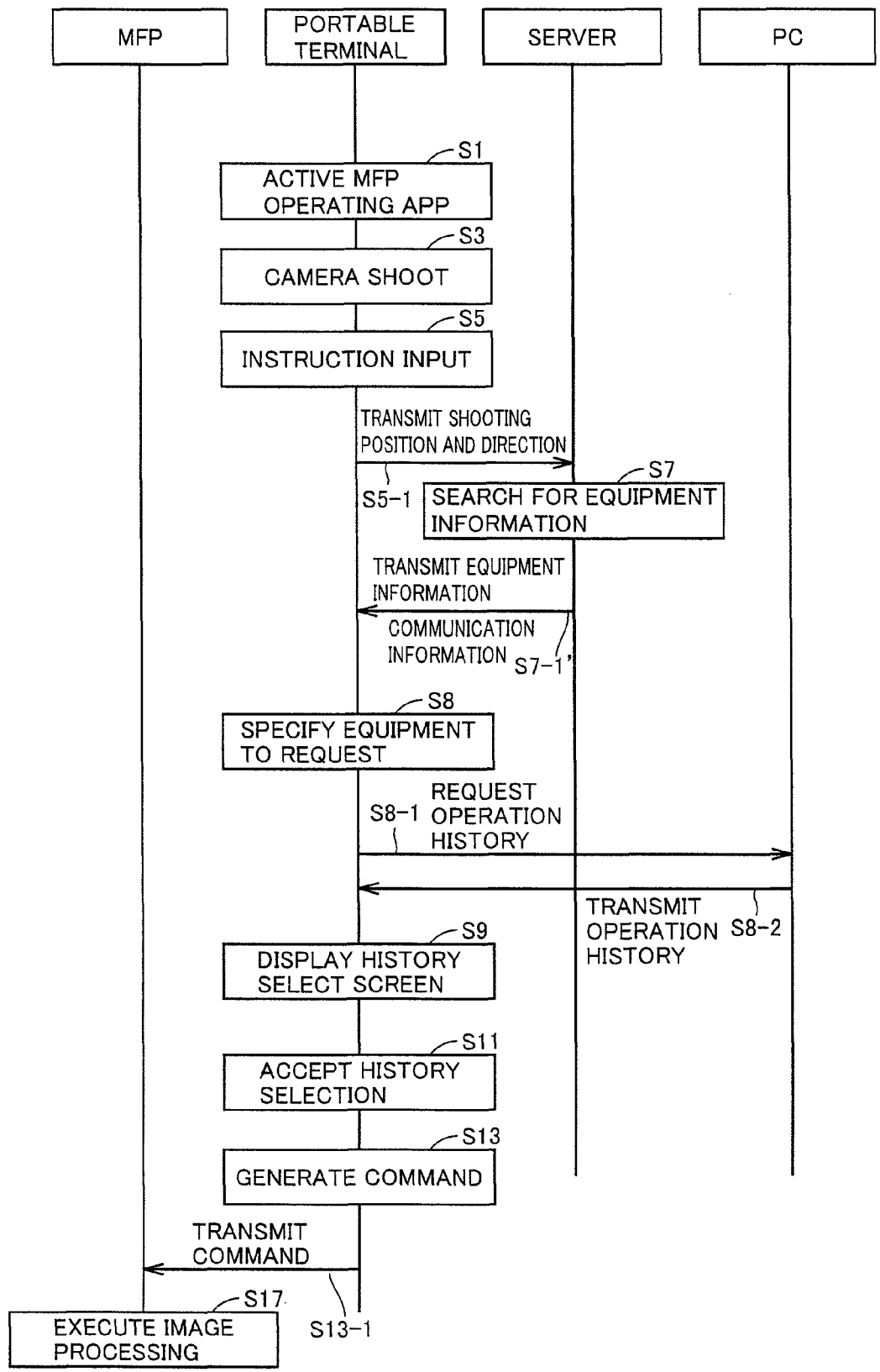
FIG. 13 is a sequence diagram depicting a flow of an operation for operating the MFP in an operation flow 2.

FIG. 13 is a sequence diagram illustrating a flow of an operation for operating the MFP in operation flow 2. FIG. 13 shows a flow of processing in MFP 100 on the left, a flow of processing in portable terminal 400, second from left, a flow of processing in server 300, third from left, and a flow of processing in PC 200 on the right. Each operation is implemented when the CPU of each device reads out a program stored in the ROM and executes the program on the RAM.

Referring to FIG. 13, similarly to the flow up to step S5 in the operation illustrated in FIG. 9, the information specifying the shooting position and shooting direction at portable terminal 400 is transmitted to server 300 in step S5-1. Upon request for the corresponding equipment information, the equipment information about the corresponding device is searched for in server 300 in step S7, similarly as in operation flow 1 illustrated in FIG. 9. The found equipment information is transmitted from server 300 to portable terminal 400 in step S7-1'. In operation flow 2, the equipment information does not have to include the operation history as a precondition, and of the equipment information, at least the communication information is transmitted in step S7-1'.

In operation flow 2, portable terminal 400 receiving the equipment information specifies the equipment from which the operation history is requested, based on the communication information included in the equipment information (step S8). The operation history is requested from the specified equipment (step S8-1). Then, in response to the request, the operation history of MFP 100 is transmitted to portable terminal 400 (step S8-2).

Similarly as in the description of operation flow 1, in the case where the operation history is associated with the user ID of the user who has performed the operation, each device stores the correspondence between the information specifying portable terminal 400 and the user ID beforehand, so that each device can transmit the operation history associated with the user ID corresponding to portable terminal 400 that has requested the operation history, among the stored operation history, to portable terminal 400, in step S8-2.

FIG. 13 shows an example in which the equipment information about PC 200 is transmitted from server 300 to portable terminal 40, and the operation history of MFP 100 is requested by portable terminal 400 from PC 200 based on the equipment information. FIG. 13 is an example of operation flow 2, which is applicable to a case where the equipment information about MFP 100 is transmitted from server 300 to portable terminal 400. More specifically, also in this case, the equipment information does not include the operation history as a precondition, and portable terminal 400 receiving the equipment information requests the operation history from MFP 100 based on the communication information included in the equipment information and obtains the operation history from MFP 100 responding to the request.

The following operation after step S9 is similar to operation flow 1 shown in FIG. 9.

<Effects of Embodiment>

Through the operation as described above in the image processing system according to the embodiment, MFP 100 can be operated using portable terminal 400 as described in the operation overview.

As the recent MFPs have been more sophisticated, even more functions are installed and available in MFPs. In such a case, many options for selecting a function to be operated from those functions as well as options for operation in those functions are displayed on the operation screens appearing on operation panel 15 of MFP 100. Therefore, such operation screens are difficult to operate for the users unfamiliar with them.

In such a case, in the image processing system according to the embodiment, the user can activate the dedicated application in portable terminal 400 familiar to them and points portable terminal 400 to shoot a device, so that the operation history on MFP 100 in the device is displayed in a selectable manner. Then, the same operation history as the desired operation is selected therefrom, thereby allowing MFP 100 to execute the image processing designated by the operation.

Accordingly, the user can easily perform an operation for executing image processing indicated by the operation history. In addition, even when MFP 100 is located at a distance from the user, the user does not have to move there and can operate MFP 100 with portable terminal 400 the user carries.

<Modified Embodiment>

In the foregoing description, as a precondition of the operation for operating MFP 100 using portable terminal 400, one of the devices included in the image processing system is shot by camera 46, and the shooting position and shooting direction then are transmitted to server 300. Server 300 stores the positional information of each device beforehand and specifies the device located within a shooting range obtained from the shooting position and shooting direction from portable terminal 400.

However, it is not always necessary to shoot a photo with portable terminal 400 at the start of the operation, as a precondition of the operation for operating MFP 100, and an image shot and stored before may be used.

In this case, image data obtained by shooting a device included in the image processing system with camera 46 is stored beforehand in portable terminal 400, in association with the positional information and orientation information at the time of shooting. In other words, a shot image is stored in portable terminal 400 in association with the shooting position and shooting direction.

Figure 14:
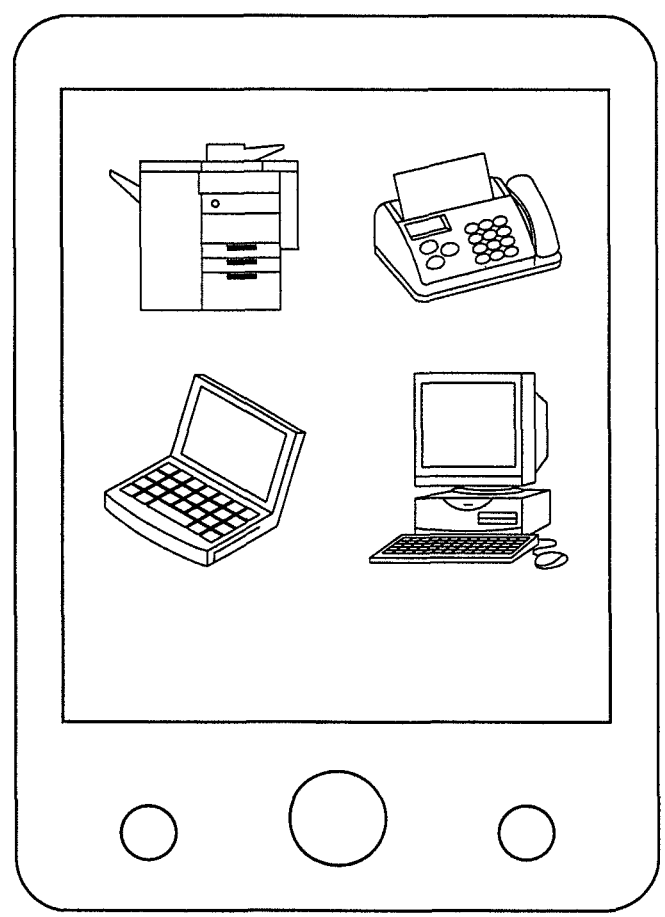
FIG. 14 is a diagram showing a specific example of a select screen for selecting a device for which operation history is requested.

At portable terminal 400, the application for operating the MFP is activated to display a screen for selecting a device to be operated. On this screen, images shot before are displayed as choices from which a target device is selected. FIG. 14 is a diagram showing a specific example of a select screen for selecting a device for which operation history is requested. Referring to FIG. 14, it is assumed, by way of example, that image data of each device shot before is stored in portable terminal 400, and the application is activated to display the shot images in a selectable manner. In place of the shot images, an icon for selecting each device may be displayed, or an entry field for designating one of the devices in text may be displayed. It is noted that in these cases, the shooting position and shooting direction of the corresponding device are associated and stored beforehand.

Figure 15:
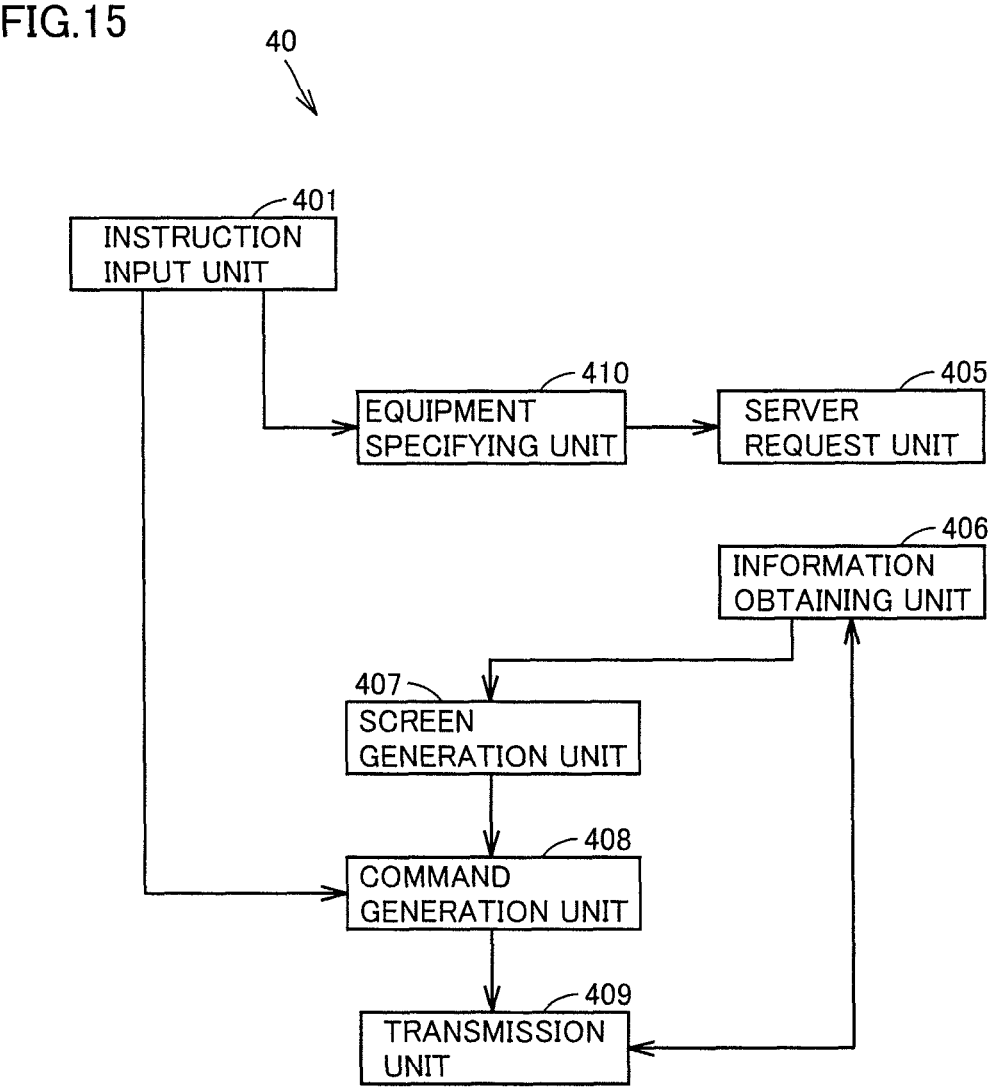
FIG. 15 is a diagram showing a specific example of a functional configuration of the portable terminal according to a modified embodiment.

FIG. 15 is a diagram showing a specific example of a functional configuration of portable terminal 400 according to a modified embodiment. Each function shown in FIG. 15 is also a function mainly formed in CPU 40 when CPU 40 reads out a program stored in ROM 41 and executes the program on RAM 42. However, at least part of the functions may be formed by the hardware configuration shown in FIG. 4.

Referring to FIG. 15, portable terminal 400 according to the modified embodiment includes an equipment specifying unit 410 in place of position obtaining unit 402, orientation obtaining unit 403, and image obtaining unit 404 shown in FIG. 7.

Equipment specifying unit 410 accepts input of a signal indicating an operation position on the select screen as shown in FIG. 14 at instruction input unit 401 from operation panel 45, specifies the selected equipment based on the signal, and outputs the shooting position and shooting direction stored in association with the equipment to server request unit 405. Server request unit 405 of portable terminal 400 according to the modified embodiment requests the equipment information from server 300 along with the input shooting position and shooting direction.

Through the operation shown in the modified embodiment, when image data of the equipment shot before is stored, MFP 100 can be operated using the shot image without shooting a photo again. Even when portable terminal 400 does not have a shooting function, if the information specifying each device is stored beforehand, MFP 100 can be operated using the stored information.

The present invention also provides a program for allowing each device included in the image processing system to execute the foregoing operation. Such a program may be stored in a computer-readable recording medium accompanying a computer, such as a flexible disk, a CD-ROM (Compact Disk-Read Only Memory), a ROM, a RAM, and a memory card, and be provided as a program product. Alternatively, the program may be stored in a recording medium such as a hard disk contained in a computer. The program may be downloaded via a network.

The program in accordance with the present invention may allow the process to be executed by invoking necessary modules, among program modules provided as a part of Operating System (OS) of a computer, in a prescribed sequence at a prescribed timing. In this case, the modules are not included in the program itself and the process is executed in cooperation with OS. The program that does not include such modules may also be included in the program in accordance with the present invention.

Furthermore, the program in accordance with the present invention may be embedded in a part of another program. In this case, the modules included in another program are not included in the program itself, and the process is executed in cooperation with another program. Such a program embedded in another program may also be included in the program in accordance with the present invention.

The provided program product is installed in a program storage unit such as a hard disk for execution. It is noted that the program product includes the program itself and a recording medium encoded with the program.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing system comprising:
a portable terminal;
equipment; and
an information processing apparatus,
wherein at least one of said equipment is an image processing apparatus including a controller,
said portable terminal including
a shooting unit,
an obtaining unit for obtaining positional information and orientation information of said portable terminal,
a display unit, and
an input unit for inputting an instruction on an operation screen displayed on said display unit,
said information processing apparatus including
a storage unit for storing, as information about said equipment, positional information of said equipment and communication information for communicating with said equipment, wherein
said portable terminal transmits positional information and orientation information at a time of shooting by said shooting unit to said information processing apparatus,
said information processing apparatus detects said equipment included in an image shot by said shooting unit of said portable terminal, based on the positional information and orientation information at a time of shooting at said portable terminal, and transmits information about said detected equipment to said portable terminal, and
said portable terminal further includes a controller for executing a process of obtaining an operation history on said image processing apparatus in said equipment, based on said received information about said equipment, allowing said display unit to display an operation screen presenting said operation history in a selectable manner, and when accepting a selection of said operation history at said input unit, transmitting a control signal for allowing said image processing apparatus to execute image processing specified by said selected operation history, to said image processing apparatus.

2. The image processing system according to claim 1, wherein
said information processing apparatus further stores an operation history on said image processing apparatus in said equipment as said information about said equipment, and
said controller of said portable terminal allows said display unit to display said operation screen using said operation history included in said received information about said equipment.

3. The image processing system according to claim 1, wherein said controller of said portable terminal requests an operation history on said image processing apparatus from said equipment, based on said communication information for communicating with said equipment that is included in said received information about said equipment, and obtains said operation history received from said equipment.

4. The image processing system according to claim 1, wherein
said portable terminal further includes a storage unit for storing positional information and orientation information at a time when said equipment is shot, in association with information specifying said equipment, and
when accepting a selection of said equipment, said portable terminal transmits positional information and orientation information at a time when said selected equipment is shot, to said information processing apparatus.

5. The image processing system according to claim 1, wherein said equipment includes a controller for controlling said image processing apparatus.

6. The image processing system according to claim 1, wherein said operation history includes information specifying an image processing apparatus that has executed image processing designated by the operation, a function of said image processing apparatus that is necessary for said image processing, and image data subjected to said image processing.

7. The image processing system according to claim 6, wherein when allowing said display unit to display said operation screen, said controller of said portable terminal sorts said operation history so as to be displayed for each image processing apparatus that has executed image processing designated by said operation history.

8. The image processing system according to claim 6, wherein when allowing said display unit to display said operation screen, said controller of said portable terminal sorts said operation history so as to be displayed for each function of said image processing apparatus that is necessary for image processing designated by said operation history.

9. The image processing system according to claim 1, wherein
said operation history includes information specifying an image processing apparatus that has executed image processing designated by the operation, a function of said image processing apparatus that is necessary for said image processing, image data subjected to said image processing, and a storage location of image data obtained by said image processing, and
when allowing said display unit to display said operation screen, said controller of said portable terminal sorts said operation history so as to be displayed for each storage location of image data obtained by image processing designated by said operation history.

10. The image processing system according to claim 1, wherein said controller of said portable terminal allows said display unit to display said operation history in a selectable and changeable manner on said operation screen, and when accepting an instruction to change said operation history on said operation screen, transmits a control signal for allowing said image processing apparatus to execute image processing specified by said changed operation history, to said image processing apparatus.

11. A control method for an image processing system including a portable terminal having a shooting unit and a display unit, equipment, at least one of which is an image processing apparatus, and an information processing apparatus,
wherein said information processing apparatus stores, as information about said equipment, positional information of said equipment and communication information for communicating with said equipment,
said control method comprising the steps of:
causing said portable terminal to transmit positional information and orientation information at a time of shooting by said shooting unit of said portable terminal to said information processing apparatus;
causing said information processing apparatus to detect equipment included in an image shot by said shooting unit of said portable terminal, based on said positional information and orientation information transmitted from said portable terminal and the positional information included in said information about said equipment, and to transmit said information about said detected equipment to said portable terminal;
causing said portable terminal to obtain an operation history on said image processing apparatus in said equipment, based on said information about said equipment transmitted from said information processing apparatus, and to allow said display unit to display an operation screen presenting said operation history in a selectable manner;
when accepting a selection of said operation history, causing said portable terminal to transmit a control signal for allowing said image processing apparatus to execute image processing specified by said selected operation history, to said image processing apparatus; and
executing corresponding image processing based on said signal in said image processing apparatus.

12. A portable terminal comprising:
a shooting unit;
an obtaining unit for obtaining positional information and orientation information of said portable terminal;
a display unit;
an input unit for inputting an instruction on an operation screen displayed on said display unit; and
a controller,
wherein said controller executes
a process of transmitting positional information and orientation information at a time of shooting by said shooting unit to an information processing apparatus,
a process of obtaining an operation history on an image processing apparatus in equipment based on information about equipment that is received from said information processing apparatus, and allowing said display unit to display an operation screen presenting said operation history in a selectable manner, and
a process of accepting a selection of said operation history at said input unit and then transmitting a control signal for allowing said image processing apparatus to execute image processing specified by said selected operation history, to said image processing apparatus.

13. The portable terminal according to claim 12, wherein said controller further executes
a process of requesting said operation history from said equipment based on communication information for communicating with said equipment that is included in said received information about said equipment, in the process of allowing said display unit to display an operation screen, and
a process of receiving said operation history from said equipment.

14. A non-transitory computer-readable recording medium encoded with a control program for causing a portable terminal to execute processing,
said portable terminal including a shooting unit and a display unit,
said control program causing said portable terminal to execute the steps of:
transmitting positional information and orientation information at a time of shooting by said shooting unit to an information processing apparatus;
obtaining an operation history on an image processing apparatus in equipment based on information about equipment that is received from said information processing apparatus, and displaying an operation screen presenting said operation history in a selectable manner on said display unit; and
accepting a selection of said operation history and then transmitting a control signal for allowing said image processing apparatus to execute image processing specified by said selected operation history, to said image processing apparatus.

15. The non-transitory computer-readable recording medium according to claim 14, wherein said step of said control program of displaying an operation screen on said display unit includes the steps of:

requesting said operation history from said equipment based on communication information for communicating with said equipment that is included in said received information about said equipment; and receiving said operation history from said equipment.

* * * * *